Feb. 3, 1925.

J. A. GORRELL

MOLDING MACHINE

Filed July 21, 1923    2 Sheets-Sheet 1

1,525,178

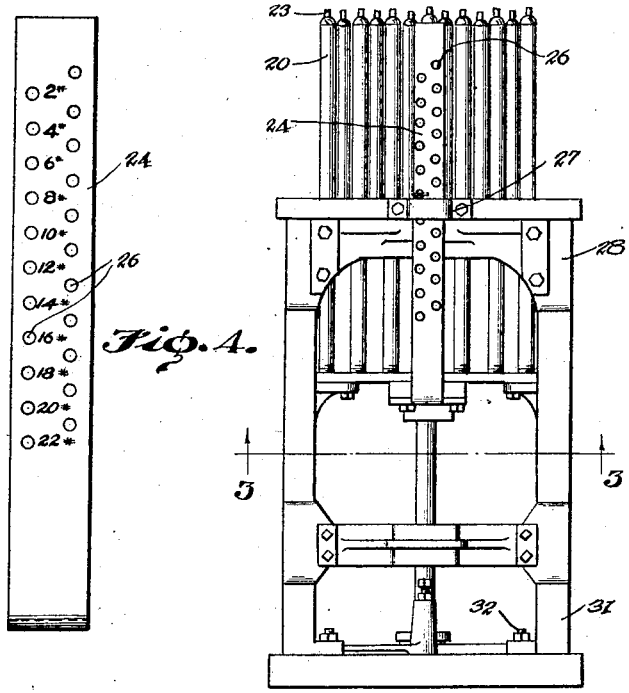
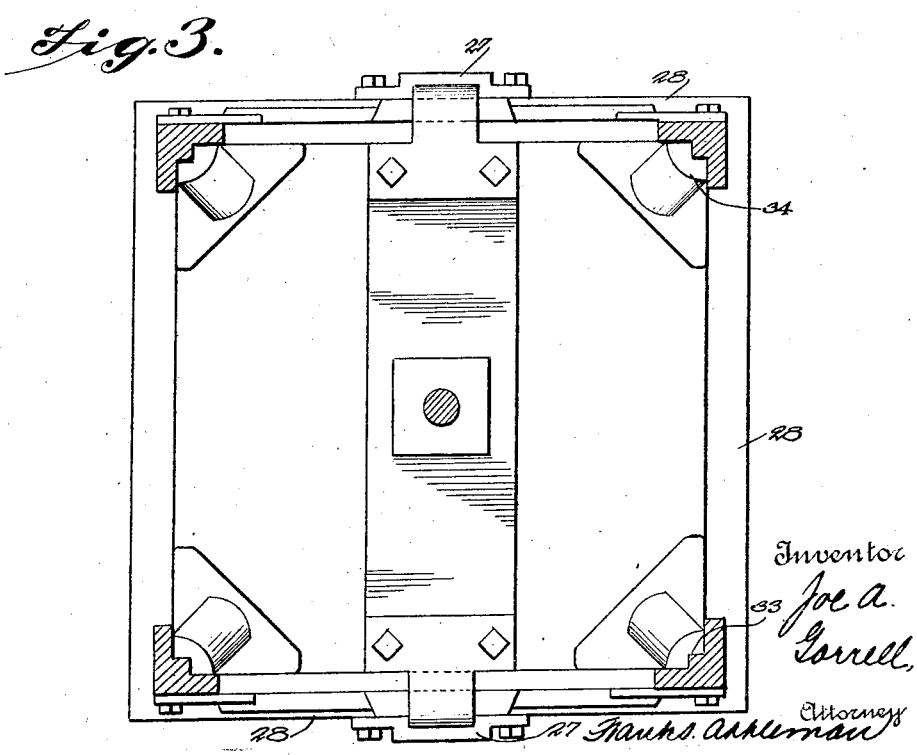

Patented Feb. 3, 1925.

1,525,178

UNITED STATES PATENT OFFICE.

JOE ALLEN GORRELL, OF LIMA, OHIO.

MOLDING MACHINE.

Application filed July 21, 1923. Serial No. 653,011.

*To all whom it may concern:*

Be it known that I, JOE A. GORRELL, a citizen of the United States of America, and resident of Lima, in the county of Allen and State of Ohio, have invented certain new and useful Improvements in Molding Machines, of which the following is a specification.

This invention relates to molding machines, and particularly to a machine for molding sash weights.

It is the purpose of this invention to provide novel means whereby a mold with the cores or patterns may be vibrated to pack or ram the sand; the said invention also including novel means for withdrawing the patterns from the mold and permitting the mold to be removed and poured, according to the usual processes, although, in this connection, it may be stated that it is the purpose of the inventor to have the top of the mold scrape down to the top of the pattern gate, a step of the process which will form a basin in the top of the mold, into which the molten metal will be directed by a runner box preferably protected by dried mud prior to its being used.

It is a further object of this invention to produce a machine having means whereby the patterns and mold or flask are vibrated or jarred to cause the packing of the sand around the patterns.

It is a further object of this invention to produce novel means for adjusting the flask or mold support with relation to the patterns in order that the patterns may project, to a greater or less extent, into the mold to increase or diminish the cavities therein that are to be filled with metal during the casting process, for it is by this latter means that sash weights of different sizes may be produced, that is to say, the sash weights will be of the same cross sectional configuration, but will be of different lengths.

Of course, it is the purpose of the inventor also to produce a machine in which patterns of different diameters may be employed, but in those cases, the lifting plate which carries the patterns will be changeable to suit particular requirements.

It is a further object of this invention to produce a molding device of the character indicated in which, by an adjustment of the lifting plate supporting means, the weight in pounds may be determined prior to the operation of the machine.

It is a still further object of this invention to produce means for raising and lowering the patterns with respect to a stripping plate through which the patterns extend, the said lifting means being associated with the vibrating mechanism of the molding machine to produce a compact and comparatively inexpensive assembly.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 2 illustrates a view in elevation thereof;

Figure 3 illustrates a sectional view on the line 3—3 of Fig. 2 on an enlarged scale; and Figure 4 illustrates an enlarged detail view of a bracket.

Figure 1:
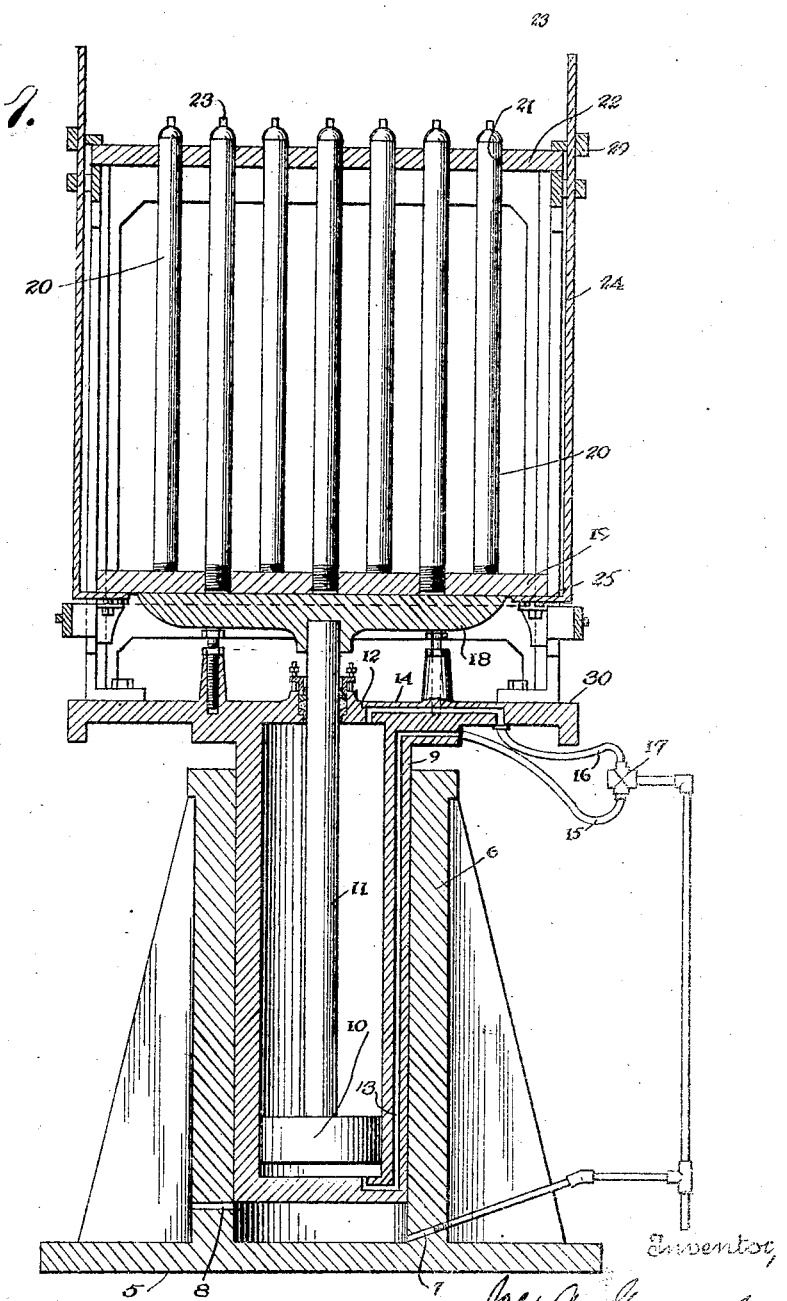
Figure 1 illustrates a sectional view of a sash weight molding machine embodying the invention.

In these drawings, 5 denotes a suitable base having an upstanding cylinder 6 thereon or made as a part thereof, the said cylinder being provided with a pressure delivery port 7 and an exhaust port 8; it being the purpose of the inventor that air or steam pressure shall be supplied to the bottom of the cylinder for raising the piston 9 which operates therein, so that when the said piston has been raised to uncover the exhaust port 8, pressure will escape and permit the piston to descend with a jar which will so vibrate the sand in the mold carried by the mechanism, as will presently appear, in order that the sand may be packed around the patterns.

The piston 9 is hollow and it forms a cylinder in which a piston 10 is movable, the said piston having a piston rod 11 projecting through the head 12 thereof. The wall of the piston 9 has a duct 13 leading to the interior below the piston 10, and a duct 14 leading to the interior above the piston. Pressure supply pipes 15 and 16 connect to the ducts 13 and 14 respectively and are under control of a valve 17 by which pressure can be delivered for raising the piston 10 or for forcing it down, as will presently appear.

The piston 11 is provided with a plate or head 18 to which a lifting plate 19 is connected and by which the lifting plate is supported. The lifting plate has a plurality of patterns 20 which project through apertures such as 21 in the stripping plate 22. The upper ends of the patterns have gates 23, and when a flask or mold has been placed on the stripping plate and filled with sand, the mechanism is vibrated by the reciprocation of the piston 9 and the jar resulting from its coming to an abrupt stop on its descent, and after the jarring operation has proceeded until the sand is properly packed, the piston 10 will be forced downwardly to withdraw the patterns from the mold.

Brackets or hangers 24 are connected by their right angular extensions 25 to the lifting plate, and the said brackets have apertures 26 that are graduated and identified by numbers representing the weight by pounds of the sash weight that will be cast when the patterns are in the different positions of adjustment. The brackets are movable vertically in guides 27 that are secured on the outer surface of the frame 28, and after air has been admitted to raise the piston 10 with the patterns to the proper degree to produce sash weights of the required weight, a pin 29 is applied to an aperture of each bracket and the pin is applied to the aperture that is in line with the upper edge of the stripping plate, thus causing the lifting plate and patterns to be held against movement with relation to the stripping plate while sand is being packed in the flasks or molds. The provision of the pins in the relations stated guards against any movement of the patterns in the molds which might tend to reduce the degree of their projection into the molds.

After the sand has been packed, the pins are removed and air is admitted through the duct 14 to operate on the top of the piston 10, thus causing the patterns to be withdrawn from the mold.

If the patterns were raised until the aperture marked "4" were just above the stripping plate and the pins were inserted in that aperture, the apparatus would form molds that would produce sash weights weighing 4 pounds, and so the result would be proportional if apertures numbered "7" were adjusted in the manner stated with relation to the stripping plate.

The table 30 is moved up and down with the piston 9 as it is a part of the piston 9, or it will be so constructed as to be attached to the piston 9, and this table supports the frame 28 to which reference has been made, and the said frame has corner posts 31 that are secured to the table by fastenings 32, such as bolts or the like; it being observed that the stripping plate reciprocates in the frame in order that the patterns may be moved up and down through the stripping plate. The posts of the frame have their inner surfaces provided with ribs 33 that constitute guides to be engaged by the shoes 34 at the corners of the stripping plate, and by this means, the stripping plate is guided vertically in the frame.

The eye of the weight is formed by two half chills.

I claim:

1. In a molding machine, a table, means for vibrating the table vertically, a lifting plate, patterns extending upwardly therefrom, a stripping plate through which the patterns project, means for raising and lowering the lifting plate independently of the stripping plate, means for supporting the lifting plate with relation to the stripping plate independently of the means for moving the lifting plate, and means for determining the size of the casting by the position of the lifting plate with relation to the stripping plate.

2. In a molding machine, a table, a frame thereon, a stripping plate supported by the table, a lifting plate movable with relation to the table and stripping plate, means for retaining the lifting plate in different positions of adjustment with relation to the stripping plate, means for moving the lifting plate, and means for vibrating the table, substantially as described.

3. In a molding machine, a table having a cylindrical extension, a cylinder in which the cylindrical extension is movable, pressure applying means for delivering pressure to the cylinder under the cylindrical extension whereby the table is vibrated, a piston operating in the cylindrical extension, means for delivering pressure to the interior of the cylindrical extension above and below the piston, a lifting plate supported by the piston, patterns carried by the lifting plate, a stripping plate through which the patterns extend, and means for fastening the lifting plate and stripping plate together at different positions of adjustment.

4. In a molding machine, a table having a cylindrical extension, a cylinder in which the cylindrical extension is movable, pressure applying means for delivering pressure to the cylinder under the cylindrical extension whereby the table is vibrated, a piston operating in the cylindrical extension, means for delivering pressure to the interior of the cylindrical extension above and below the piston, a lifting plate supported by the piston, patterns carried by the lifting plate, a stripping plate through which the patterns extend, means for fastening the lifting plate and stripping plate together at different positions of adjustment, and means for determining the size of the casting produced by the cavity formed by the patterns, substantially as described.

5. In a molding machine, a table, means for vibrating the table vertically, a frame supported on the table, a lifting plate guided by the frame, power applying means for moving the lifting plate vertically, a stripping plate supported by the frame, hangers for holding the lifting plate in different positions of adjustment with relation to the stripping plate, and patterns extending upwardly from the lifting plate through the stripping plate, substantially as described.

JOE ALLEN GORRELL.